US008029347B2

(12) United States Patent
Pohlmann et al.

(10) Patent No.: US 8,029,347 B2
(45) Date of Patent: Oct. 4, 2011

(54) CROP RESIDUE CHOPPING-AND-DISTRIBUTING ARRANGEMENT FOR A COMBINE

(75) Inventors: Norbert Pohlmann, Zwelbrücken (DE); Friedrich K Lauer, Krähenberg (DE); Dirk Weichholdt, Woelfling les Sarreguemines (FR); Rico Priesnitz, Lebach (DE); Oliver Klein, Saarlouis (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/778,682

(22) Filed: May 12, 2010

(65) Prior Publication Data

US 2010/0291984 A1    Nov. 18, 2010

(30) Foreign Application Priority Data

May 14, 2009  (DE) .......................... 10 2009 003 123

(51) Int. Cl.
*A01F 12/40* (2006.01)
(52) U.S. Cl. ........................................ 460/112
(58) Field of Classification Search .................. 460/112, 460/111, 901; 239/682, 650, 672, 687, 673
See application file for complete search history.

(56) References Cited

U.S. PATENT DOCUMENTS

| 5,797,793 | A  | * | 8/1998 | Matousek et al. | 460/111 |
| 6,598,812 | B1 | * | 7/2003 | Matousek et al. | 239/682 |
| 6,602,131 | B2 | * | 8/2003 | Wolters | 460/111 |
| 6,685,558 | B2 | * | 2/2004 | Niermann et al. | 460/111 |
| 6,736,721 | B2 | * | 5/2004 | Niermann et al. | 460/112 |
| 7,086,942 | B2 | * | 8/2006 | Niermann et al. | 460/111 |
| 7,223,168 | B2 | * | 5/2007 | Anderson et al. | 460/111 |
| 7,281,973 | B2 | * | 10/2007 | Anderson et al. | 460/111 |
| 7,281,974 | B2 | * | 10/2007 | Anderson et al. | 460/111 |
| 7,331,855 | B2 | * | 2/2008 | Johnson et al. | 460/112 |
| 7,467,997 | B2 | * | 12/2008 | Niermann et al. | 460/111 |
| 7,485,035 | B1 | * | 2/2009 | Yde | 460/111 |
| 7,553,227 | B2 | * | 6/2009 | Landuyt | 460/111 |
| 2004/0092298 | A1 | * | 5/2004 | Holmen | 460/111 |
| 2004/0132517 | A1 | * | 7/2004 | Weichholdt et al. | 460/112 |
| 2007/0026912 | A1 | * | 2/2007 | Anderson et al. | 460/112 |
| 2007/0026914 | A1 | * | 2/2007 | Anderson et al. | 460/112 |
| 2007/0026915 | A1 | * | 2/2007 | Anderson et al. | 460/112 |

(Continued)

FOREIGN PATENT DOCUMENTS

DE    19908111 C1    7/2000

(Continued)

OTHER PUBLICATIONS

European Search Report dated Aug. 26, 2010, (6 pages).

*Primary Examiner* — Árpád Fábián-Kovács (57) ABSTRACT

The invention relates to a crop residue chopping-and-distributing arrangement for a combine, with a straw chopper (60) and two distribution blowers (100) arranged laterally alongside one another, on the periphery of which is provided a respective first shield (144), adjustable about axis of rotation (108) for modifying the distribution characteristics, that can be brought into an active position. It is proposed that the first shields (144) are respectively mounted on a rotary holder (176) rotatable about axis of rotation (84) of the associated distribution blower (100) and additionally carrying a second shield (146), which has a smaller dimension in the circumferential direction than first shield (144), so that second shield (146) can selectively be brought into an active position instead of first shield (144).

15 Claims, 7 Drawing Sheets

U.S. PATENT DOCUMENTS

| | | | |
|---|---|---|---|
| 2007/0037620 A1* | 2/2007 | Anderson et al. | 460/111 |
| 2010/0291983 A1* | 11/2010 | Weichholdt et al. | 460/112 |
| 2010/0291985 A1* | 11/2010 | Pohlmann et al. | 460/112 |
| 2011/0045883 A1* | 2/2011 | Weichholdt et al. | 460/112 |
| 2011/0045884 A1* | 2/2011 | Weichholdt et al. | 460/112 |

FOREIGN PATENT DOCUMENTS

| | | |
|---|---|---|
| DE | 102006017404 A1 | 10/2007 |
| EP | 0631717 A1 | 1/1995 |
| EP | 1514466 A2 | 3/2005 |
| WO | 02/34029 A1 | 5/2002 |

* cited by examiner

CROP RESIDUE CHOPPING-AND-DISTRIBUTING ARRANGEMENT FOR A COMBINE

FIELD OF THE INVENTION

The invention relates to a crop residue chopping-and-distributing arrangement for a combine.

BACKGROUND OF THE INVENTION

Agricultural combines are large machines that harvest, thresh, separate and clean agricultural crops that bear grain. The clean grain obtained is stored in a grain tank arranged on the combine. The threshed straw is generally either chopped and spread out on the field across the width of the chopping mechanism, or diverted around the straw chopper and deposited unchopped in a swath in order to be subsequently taken up in a baler. The remaining crop residue at the rear outlet of the cleaning device, such as chaff and small pieces of straw, is distributed on the field by a chaff scattering device, or directed through the straw chopper and spread on the field.

DE 199 08 111 C1 describes a combine with a straw chopper and two distribution blowers following the straw chopper, arranged one alongside the other, for strewing the straw widely across the field. For the purpose of a material transfer that does not change direction, the outlet of the straw chopper and the inlet of the distribution blowers, which are arranged in a housing and have paddles rotating about a roughly vertical axis, are arranged in a single plane. Partial casings that join one another between the distribution blowers in a tip pointing toward the straw chopper are arranged around the distribution blowers. In the rear area, the partial casings transition into shields with openings, in order to emit the straw onto the field through the openings. The shields are rotatable or height-adjustable to adjust the distribution width.

No operating mode is provided in DE 199 08 111 C1 in which only the chaff is led through the straw chopper, while the straw is deposited in the swath on the ground, as is described, for example, in DE 10 2008 001 460 A1. Accordingly, the adjustment range of DE 199 08 111 C1 does not comprise a position in which the crop residue is deposited only to the side, but not exactly toward the back. In the swath-laying mode, however, it is desirable in many cases to emit the chaff to the side some distance away from the straw in order to be able to gather and further use the latter without chaff content.

SUMMARY OF THE INVENTION

The problem underlying the invention is to provide a distribution blower arrangement for a combine that allows an unproblematic adaptation of the lateral distribution of crop residue to a swath-laying and a chopping operating mode.

This problem is solved according to the invention by the teaching of claim 1, while characteristics that further develop the invention in an advantageous manner are specified in the additional claims.

A crop residue chopping-and-distributing arrangement for a combine comprises a straw chopper and two distribution blowers arranged downstream of the straw chopper in the direction of material flow. In the harvesting mode, the straw chopper comminutes the crop residues fed to it, in particular straw.

It can also convey other crop residues such as chaff with its blades and optional additional conveying paddles, whether in common with the straw in the chopping mode, or selectively, only those residues in a straw swath-laying mode, in which the straw is led around the straw chopper.

The crop residues conveyed by the straw chopper are taken up by the two distribution blowers and spread across the field. For this purpose, the distribution blowers rotate in opposite directions, with the areas of the distribution blowers facing the straw chopper rotating toward one another.

The distribution blower on the left in the forward direction accordingly rotates clockwise as viewed from above, whereas the distribution blower on the right rotates counterclockwise as viewed from above.

In addition, a first, longer shield and a second, shorter shield are mounted on the rotating plate, supported rotatably about the axis of rotation of the distribution blower. By rotation of the rotary plate about the axis of rotation, the first shield can be selectively brought into an active position in which it causes the crop residues conveyed by the distribution blower to be emitted outward farther to the side, by initially hindering the free emission thereof, and then emitting it only downstream of the first shield.

This first shield serves particularly in the swath-laying mode to dispose of the crop residues other than the straw (such as chaff) relatively far to the outside, and therefore separate from the swath. Instead of the first shield, the second, shorter shield can also be brought into an active position in which it causes the crop residues conveyed by the distribution blower to be emitted sooner and thus farther inward than in the case of an active first shield, by allowing it to be emitted freely radially outward only via a smaller angle than the first shield. The second shield serves in particular to distribute the crop residues as uniformly as possible across the field in the chopping mode.

This enables an unproblematic modification of the distribution characteristics for the distribution blowers.

In the active position, the shields are preferably in the tapered area between the distribution blowers and behind their rotational axes. They therefore prevent the distribution blowers, which are rotating backward and outward, from ejecting the crop residues in the direction toward the central longitudinal plane of the combine and its vicinity.

In one embodiment of the invention, a rigidly mounted partial casing that covers the distribution blower externally and in the circumferential direction extends around a part of the periphery of the distribution blower. In particular, these partial casings can cover the front half of the distribution blowers if the crop residues are fed to the distribution blowers in the axial direction, whether exactly axially or at an acute or obtuse angle. In case the crop residues are fed radially, on the other hand, the partial casings can cover the distribution blowers outward toward the side and/or toward the middle.

A respective drive unit can be associated with each rotary plate that is operated by external power. It can be controlled by an operator of the combine from his seat or automatically. It is particularly beneficial to couple the drive unit with a flap that can selectively guide the straw into the straw chopper or around it, so that the drive unit brings the first shield into the active position in swath-laying mode, and the second shield into the active position in chopping mode. In chopping mode, the second shields of both distribution blowers can be adjusted independently of one another by the operator or a suitable automatic mechanism in order to compensate for influences from side winds or slopes, for example.

In particular, the shields can be mounted diametrically opposite one another on the rotary plate, so that the respective inactive shield impairs operation as little as possible.

With respect to the mounting of the shields on the distribution blowers, there are different possibilities within the scope of the inventive concept. It would be conceivable, for example, to mount the rotary holder above or below a housing of the distribution blower, but that leads to problems in many cases. In an advantageous embodiment of the invention, it is proposed that the rotary holder be provided in its central area with a central opening that is coaxial to the axis of rotation of the distribution blower. A shaft for driving the distribution blower, or a hydraulic motor for driving the distribution blower, or its supply line, can pass through this opening. The central area can be arranged axially between a cover (or bottom) of the distribution blower housing and a mounting disk connected to the cover (or bottom), and thus be fixed in the axial direction. The radial fixation is achieved in such a manner that the central opening rests against retaining elements (e.g., screws) connected to the cover (or the bottom) and/or the mounting disk, and is therefore fixed in the radial direction. The above-described slide bearing, which can also be refined by rolling contact bearings, is distinguished by a simple structure.

The drive unit for rotating the rotary plate about the axis can comprise a gear wheel meshing with external radial teeth of the central area of the rotary plate.

The distribution blowers can be partially surrounded by partial casings in the tapered area behind the axes of rotation, which, together with the second shields (and if desired a passage left free in the center between the distribution blowers through which a central part of the crop residue stream can freely reach the field from the straw chopper), bring about a desired, optimally uniform distribution of the crop residues on the field. This distribution can be achieved in particular by the fact that the second shields are lower than the first shields.

In their active positions, the second shields are preferably arranged outside the partial casings described here. The first shields, on the other hand, are arranged in the active position inside the partial casings in order to prevent the particularly finely comminuted and thus dangerous chaff from creating a blockage between the partial casing and the shield.

BRIEF DESCRIPTION OF THE DRAWINGS

An embodiment example of the invention will be described with reference to the drawings, wherein.

DETAILED DESCRIPTION OF THE PREFERRED EMBODIMENTS

Figure 1:
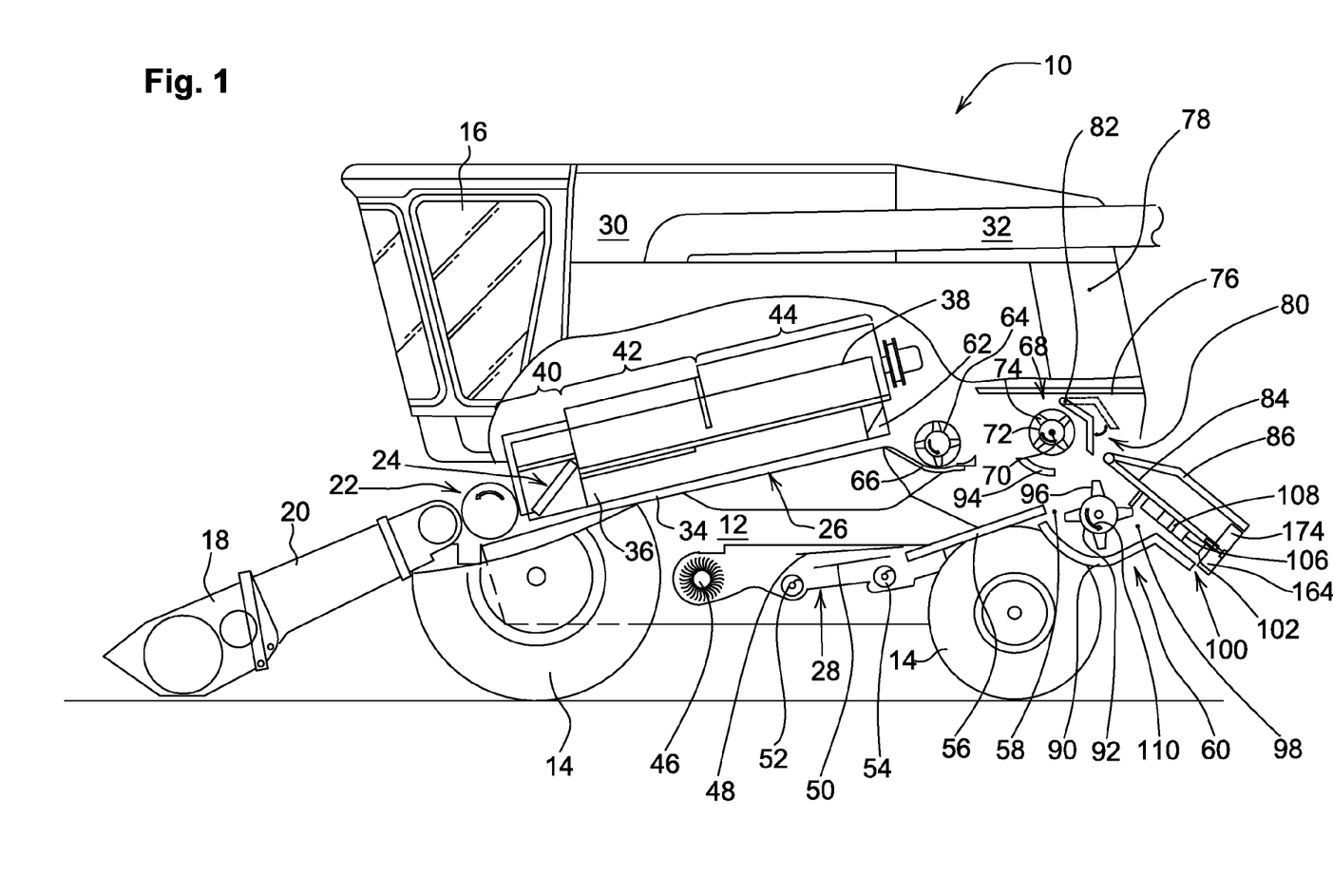
FIG. 1 shows a partial cutaway side view of a combine with a straw chopper and distribution blowers.

Directional terms in this specification such as "front" or "forward" refer to the forward direction of travel of combine 10, which is toward the left in FIG. 1. Directional terms such as "back" or "rear" refer to the reverse direction of travel of the combine—the direction opposite the forward direction, which is toward the right in FIG. 1.

FIG. 1 shows an agricultural combine 10 with a chassis 12 with wheels 14 engaged with the ground that are mounted on chassis 12 and serve to propel combine 10 in the forward direction, which runs to the left in FIG. 1. The operation of combine 10 is controlled from the operator cab 16. A cutting mechanism 18 is used to harvest a crop containing grain and supply it to an inclined conveyor 20. The harvested crop is supplied by inclined conveyor 20 to a guide drum 22. Guide drum 22 directs the crop through a transitional section 24 to an axial crop processing device 26.

Crop processing device 26 comprises a rotor housing 34 and a rotor 36 arranged therein. Rotor 36 comprises a hollow drum 38 on which crop processing elements for a loading section 40, a threshing section 42 and a separation section 44 are mounted. Loading section 40 is disposed at the front end of the axial crop processing device 26.

Threshing section 42 and separation section 44 lie downstream and to the rear of loading section 40 in the longitudinal direction. Drum 38 has the shape of a truncated cone in loading section 40.

Threshing section 42 of drum 38 has a front section and a rear section. The front section has a truncated conical shape and the rear section has a conical shape. The cylindrical separation section 44 of drum 38 is situated at the end of axial crop processing unit 26. In place of an axial crop processing unit 26, a tangential threshing drum with an axial separation device or straw shaker following it can also be used.

Grain and chaff, which fall through a threshing basket associated with threshing section 42 and a separation grating associated with separation section 44, are fed to a cleaning system 28 with a fan 46, sieve 48, and chaffer 50 that can be set into a vibrating motion. Cleaning system 28 removes the chaff and feeds the clean grain via a screw conveyor 52 to an elevator for clean grain (not shown). The elevator for clean grain deposits the clean grain in a grain tank 30. The clean grain in grain tank 30 can be discharged by a discharge screw conveyor 32 onto a grain wagon, trailer or truck. Crop remaining at the rear end of the chaffer 50 is fed by means of a screw conveyor 54 and a return conveyor (not shown) back to crop processing unit 26. The crop residues deposited at the rear end of sieve 48, which consist essentially of chaff (husks) and small straw particles, are conveyed by a vibrating conveyor 56 backward into an inlet 58 of a straw chopper 60.

Threshed straw exiting from separation section 44 is ejected from crop processing unit 26 by an outlet 62 and fed to a throw drum 64. The throw drum 64, cooperating with a floor 66 arranged underneath it, ejects the straw to the rear.

To the rear of throw drum 64 and roughly at the vertical height of its axis of rotation, there is an additional conveyor in the form of an overshot drum conveyor 68. Drum conveyor 68 runs horizontally and transverse to the forward direction, and can be set by a suitable drive unit into rotation about its shaft 70, with which it is mounted rotatably on chassis 12, in a direction in which it operates in an overshot manner and rotates clockwise in FIG. 1, as indicated by the arrow.

A hydraulic motor is generally used to drive drum conveyor 68. Drum conveyor 68 corresponds in construction to throw drum 64 and comprises a rotationally symmetric drum 72 with drivers 74 distributed about its periphery and rigidly mounted thereon. A trough 94 is arranged underneath drum conveyor 68.

Above throw drum 64 and drum conveyor 68, an upper wall 76 is arranged that extends forward horizontally and closes off an engine compartment 78 above it from the rear. At the front end of wall 76 facing drum conveyor 68, a flap 80 is pivotably articulated between an upper swath-laying position in the swath-laying mode and a lower chopping position in the chopping mode about a shaft 82 extending horizontally and transverse to the forward direction. Flap 80 is curved concavely, the radius of the flap's curvature being matched to drum conveyor 68.

Underneath the lower and rear end of flap 80 (with flap 80 in the chopping position), a metal sheet 84, fixedly connected to chassis 12, continues without a gap, running backward and downward at an incline and connected to an adjoining slide 86, on which the straw can slide onto the ground in the field during swath-laying mode. The straw swath can be brought into a desired form by runners or straw guides (not shown) arranged on the upper side of slide 86.

Flap 80 can be pivoted about shaft 82 between the chopping position, in which it is shown with solid lines in FIG. 1, and the swath-laying position, in which flap 80 is shown with dashed lines in the figure, extending backward above the flow of straw.

Underneath the sheet 84 is the straw chopper 60, composed of a stray chopper housing 90 and a rotor 92 arranged therein, rotatable about a shaft running transverse to the forward direction and horizontally, with swinging suspended chopper blades 96 distributed around the circumference of rotor 92. Additional paddles (not shown) can be mounted on rotor 92, or some or all of the chopper blades 96 can comprise paddles for air conveyance. Downstream of outlet 98 of straw chopper 60, two distribution blowers 100, of which only a single one is shown in FIG. 1, arranged side by side immediately under sheet 84. Distribution blowers 100 comprise a number of paddles 102, each capable of being set in rotation by a respective hydraulic motor 106 about its axis of rotation 108 (running roughly vertically, but slightly inclined backward and upward), to which straw chopper 60 feeds the crop residues axially from below at an obtuse angle to the axes of rotation of distribution blowers 100.

The axis of rotation 110 of rotor 92 of straw chopper 60 runs horizontally and transverse to the forward direction. The distribution blowers 100 are arranged one alongside the other lateral to and behind straw chopper 60. The distribution blowers 100 are situated inside the width of straw chopper 60. The distribution blowers 100 are fixed by holders (not shown) to frame 12 of combine 10 and/or to slide 86. It would also be possible to arrange straw chopper 60 and distribution blowers 100 in such a manner that straw chopper 60 acts on distribution blowers 100 from above. In another embodiment, the axes of rotation 108 of distribution blowers 100 are horizontal or exactly vertical.

In the swath-laying position of flap 80 (corresponding to the swath-laying mode) straw chopper 60 conveys the crop residues from cleaning system 28 only to distribution blowers 100, which distribute them on the soil of the field across the width of cutting mechanism 18.

In the chopping position of flap 80 (corresponding to the chopping mode), straw chopper 60 comminutes the straw at outlet 62 of crop processing unit 26, which is thrown by throw drum 64 and drum conveyor 68 against flap 80 and then falls down into inlet 58 of straw chopper 60.

Figure 2:
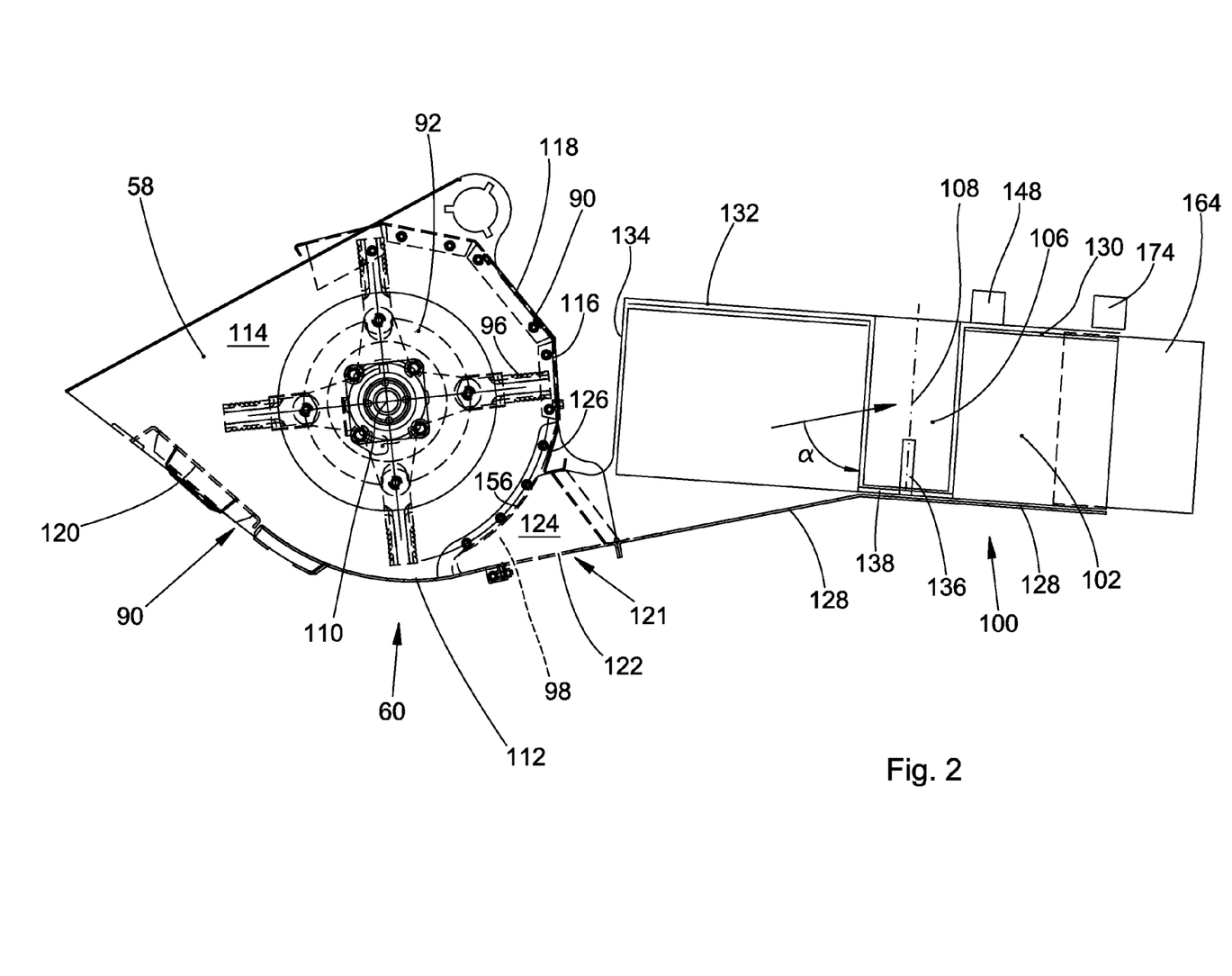
FIG. 2 shows an enlarged side view of the straw chopper and one distribution blower.
Figure 3:
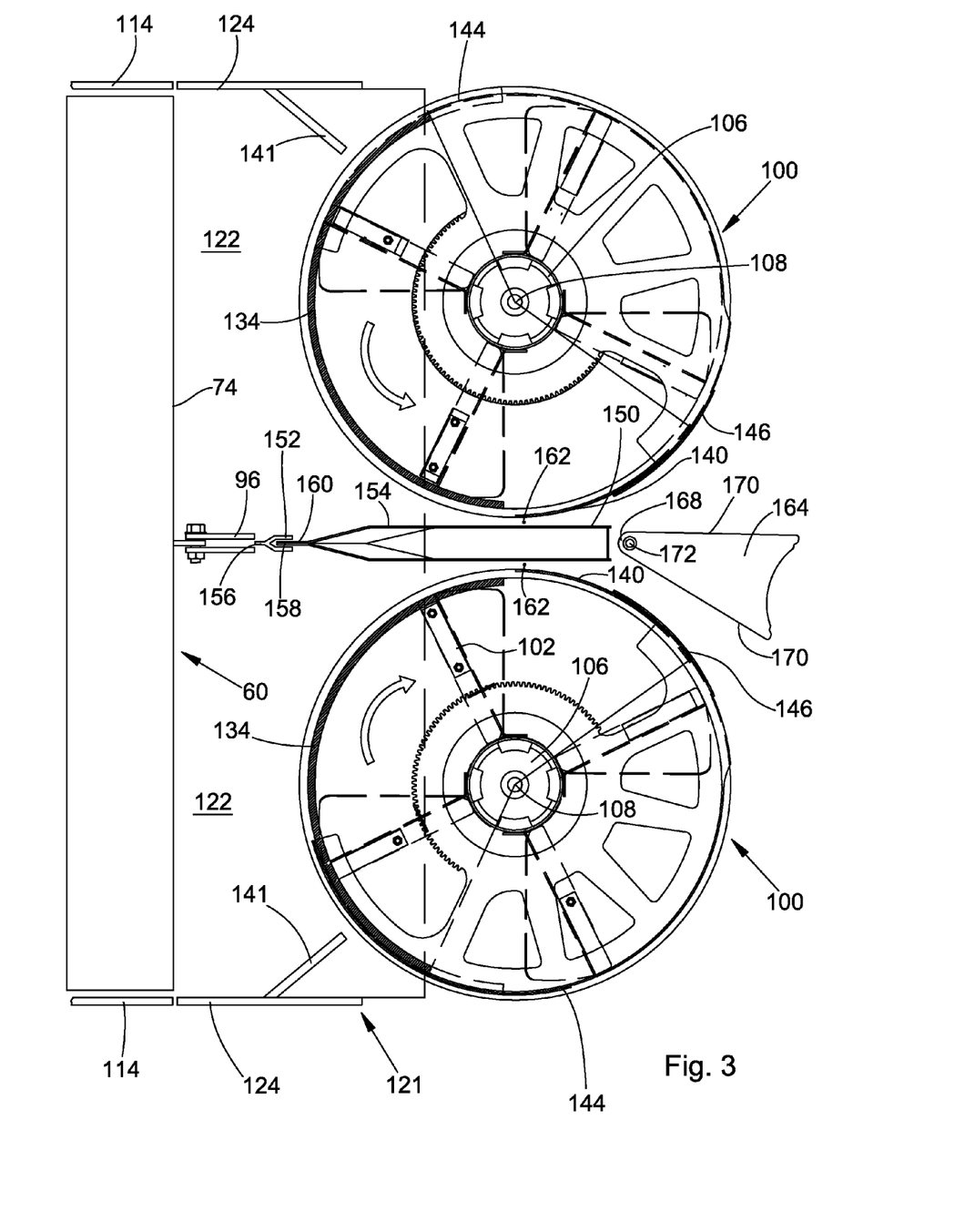
FIG. 3 shows a plan view onto the straw chopper and the distribution blowers.
Figure 4:
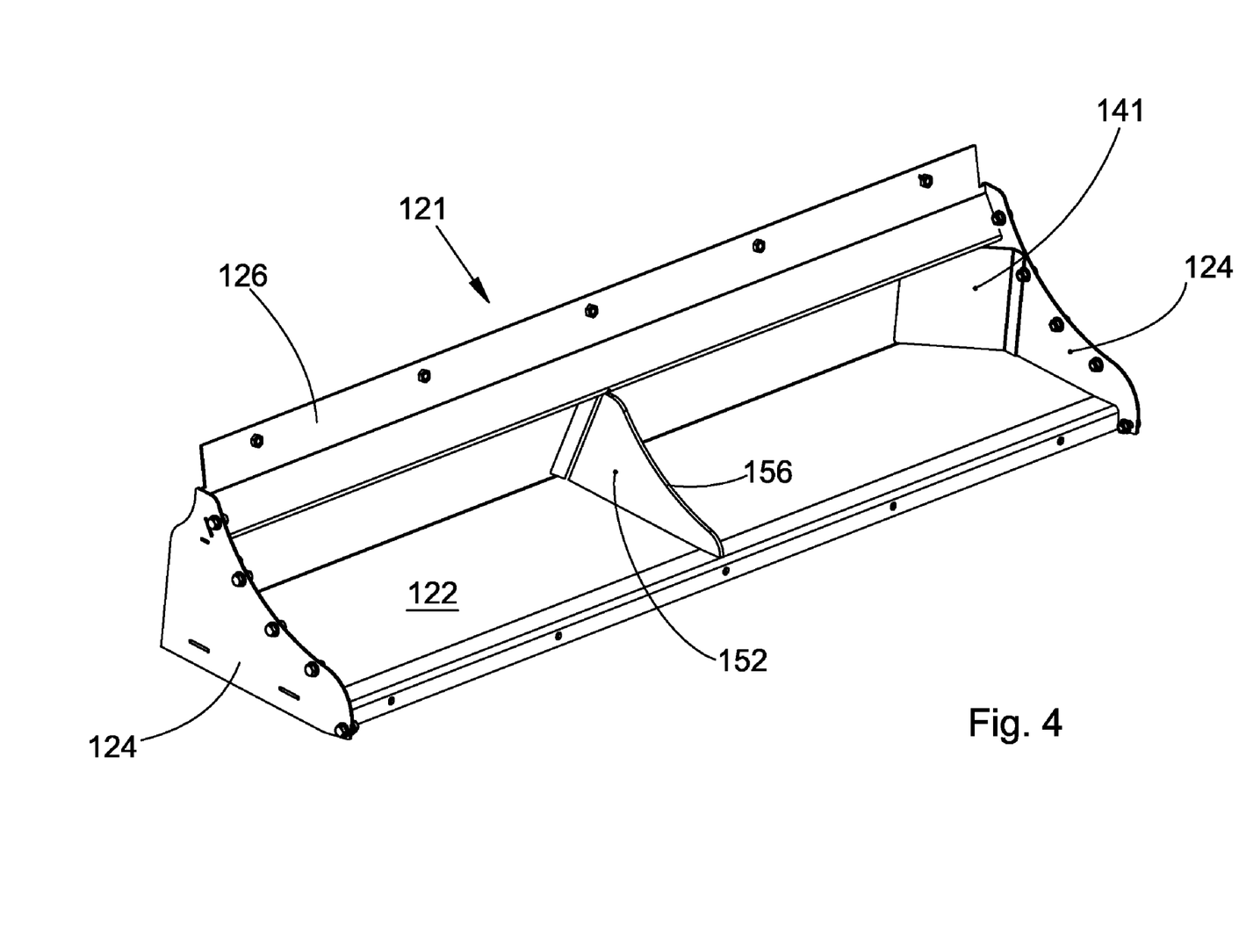
FIG. 4 shows a perspective view of a crop residue guide element.

We now refer to FIGS. 2 and 3, in which the crop residue chopping-and-distributing arrangement of combine 10 is illustrated in a side view (FIG. 2) and plan view (FIG. 3). The crop residue chopping-and-distributing arrangement comprises straw chopper 60 and distribution blowers 100. Straw chopper housing 90 comprises a base 112, two side walls 114 and additional transverse metal sheets 116, 118, 120 which, like base 112, connect the side walls 114 to one another and surround rotor 92. Base 112 is arranged on the underside of straw chopper housing 90 and encloses the envelope circle defined by chopper blades 96, with a radius leaving relatively little clearance. Opposing blades (not shown) that are mounted on straw chopper housing 90 and penetrate into the envelope circle of chopper blades 96 in order to effectively comminute the crop residues can also be provided A crop residue guide assembly 121, shown in a perspective view in FIG. 4, includes a crop residue guide element 122 which adjoins base 112 in the flow direction of the crop residues. Crop residue guide element 122 is arranged between side wall extensions 124 that are joined to a respective side wall 114 of straw chopper housing 90 by threaded connectors and run parallel to it. Crop residue guide element 122 is itself flat (accordingly has a radius of infinity). Crop residue guide element 122 is angled downward at its front end in order to form a flange that is bolted to the flange on the rear side of base 112 that is likewise angled downward. Projecting edges at which the crop residues could collect are avoided by this connection. A cross plate 126 that delimits outlet 98 of straw chopper 60 toward the top is mounted on the top of side wall extensions 124. The cross plate 116 of straw chopper housing 90 adjoins cross plate 126 at the top. It may additionally be noted that crop residue guide element 122 could be integrally produced with base 112, just as side wall extensions 124 could be integrally produced with side walls 114. The illustrated, two-part embodiment can, however, use straw chopper 60 without crop residue guide element 122 and inside wall extensions 124 (or with a different crop residue guide element and different side wall extensions, not shown) in combination with a distributor base with adjustable guide plates.

On the side wall extensions 124 (see FIG. 4), outer guide elements 141 are fastened that extend inward and backward by roughly 45°. They are rectangular in a top view and can be bent over their entire length or only in a front area adjoining a plate connected to side wall extension 124 and running parallel to it. In the vertical direction, outer guide elements 141 are flat. It would also be possible to mount the outer guide elements 141 additionally or only on crop residue guide elements 122. They could also be formed in the shape of a plowshare or a runner.

An angled bottom plate 128 that extends from a position just in front of the axes of rotation to the back end of the distribution blowers is arranged on the underside of distribution blowers 100. Bottom plate 128 has a front section that runs in the plane of crop residue guide element 122 and rests with a flange bent downward against a downward-bent flange of crop residue guide element 122. These flanges can either be bolted together or only rest against one another in order to make it easier for the distribution blowers 100 to be brought into the transport position separately from straw chopper 60. The front section of bottom plate 128 extends from the aforementioned flange to just in front of rotational axis 108 of distribution blowers 100 and transitions there into a rear section that runs up to a position below the rear end of distribution blowers 100 and orthogonally to axis of rotation 108. The paddles 100 of distribution blowers 100 are each mounted at their upper end on a plate 130 with a central opening. Paddles 100 likewise do not extend all the way up to their axis of rotation 108, but instead leave sufficient free space to be able to position hydraulic motor 106 in their center. Upper ends of the hydraulic motors 106 are mounted on a cover 132 that is located above the plate 130 and covers distribution blowers 100 at the top, the motors 106 having lower output shafts 136 that are coupled for driving the drive paddles 102 via crosslinks 138. On the front side of the cover 132 are arranged two partial casings 134 enclosing a respective distribution blower 100 semicircularly toward the front. Additional partial casings 140 connect to the adjacent interior sides of the distribution blowers 100, with gaps 142 remaining between partial casings 134 and partial casings 140. The mounting of the hydraulic motors 106 inside the paddles 102 of distribution blowers 100 is an independent invention.

Between the two distribution blowers 100, there is a two-part guide element 150, comprising a front part 152 and a rear part 154. The front part 152 is mounted on crop guide element 122 and adapted at its front tip 156 to the envelope circle of chopper blades 96, so that it is formed across its tip 156 adjacent to the envelope circle of chopper blades 96 in a circular arc shape and this tip 156 is arranged a relatively short distance away from the envelope circle of the chopper blades 96. This has the effect that crop residues collecting there, particularly in wet harvesting conditions, are removed by the chopper blades 96, so that no undesired accumulations of crop material, which could possibly cause clogging, need be feared at tip 156. On its rear side, front part 152 forms a slot 158 into which a flat front plate 160 of rear part 154 penetrates. Behind front plate 160, rear part 154 widens and is hollow. Rear part 154 is mounted on the underside of cover 132 and on the upper side of bottom plate 128, which with partial casings 134, 140 and shields 144, 146 forms a distribution blower housing.

Based on FIG. 3, it is clear that, between guide element 150 and the adjacent partial casings 134, 140 of distribution blowers 100, there are gaps 162, through which a part of the crop residue flow emitted in the central area of straw chopper 60 can flow from straw chopper 60 backward all the way onto the field.

At the rear of rear part 154 of guide element 150, a movable guide element 164 is provided, with a front tip 168, situated in the tapered gap between distribution blowers 100 behind the axes of rotation 108, and with two divergent straight lateral walls 170, each arranged adjacent to a distribution blower 100. Movable guide element 164 can be set into an oscillating motion about a front axis 172 running parallel to axes of rotation 108 of distribution blowers 100 by a drive unit 174 mounted above cover 132 to the rear of hydraulic motors 106. In this regard, we refer to DE 10 2007 037 485 B3 and DE 10 2008 055 003 A1, the disclosures of which are hereby incorporated by reference into the present document.

Figure 5:
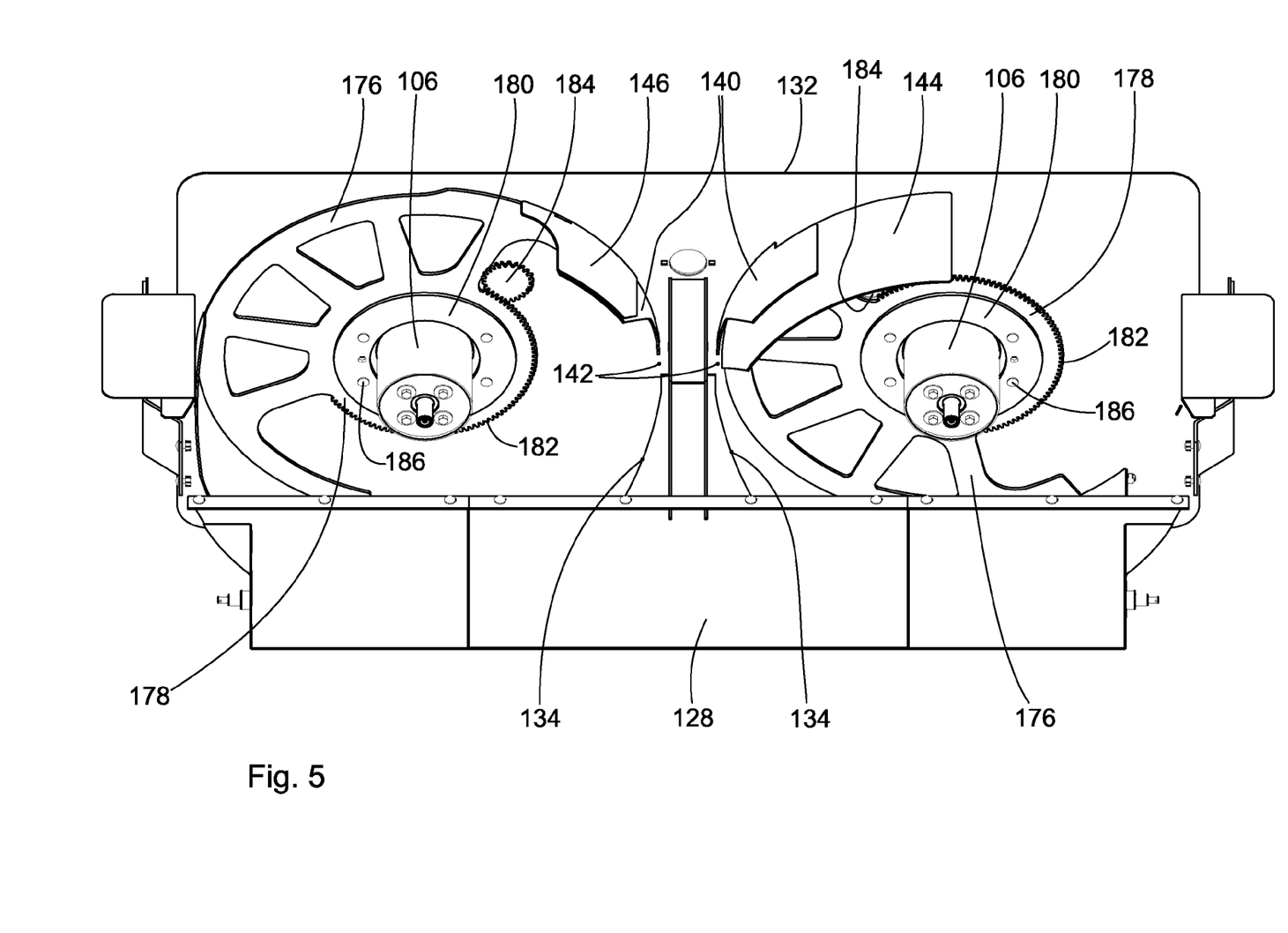
FIG. 5 shows a perspective view of the distribution blowers from the rear and below, with rotary blades and paddles removed, wherein a longer shield is in an active position in the right-hand distribution blower and a shorter shield is in an active position in the left-hand distribution blower.
Figure 6:
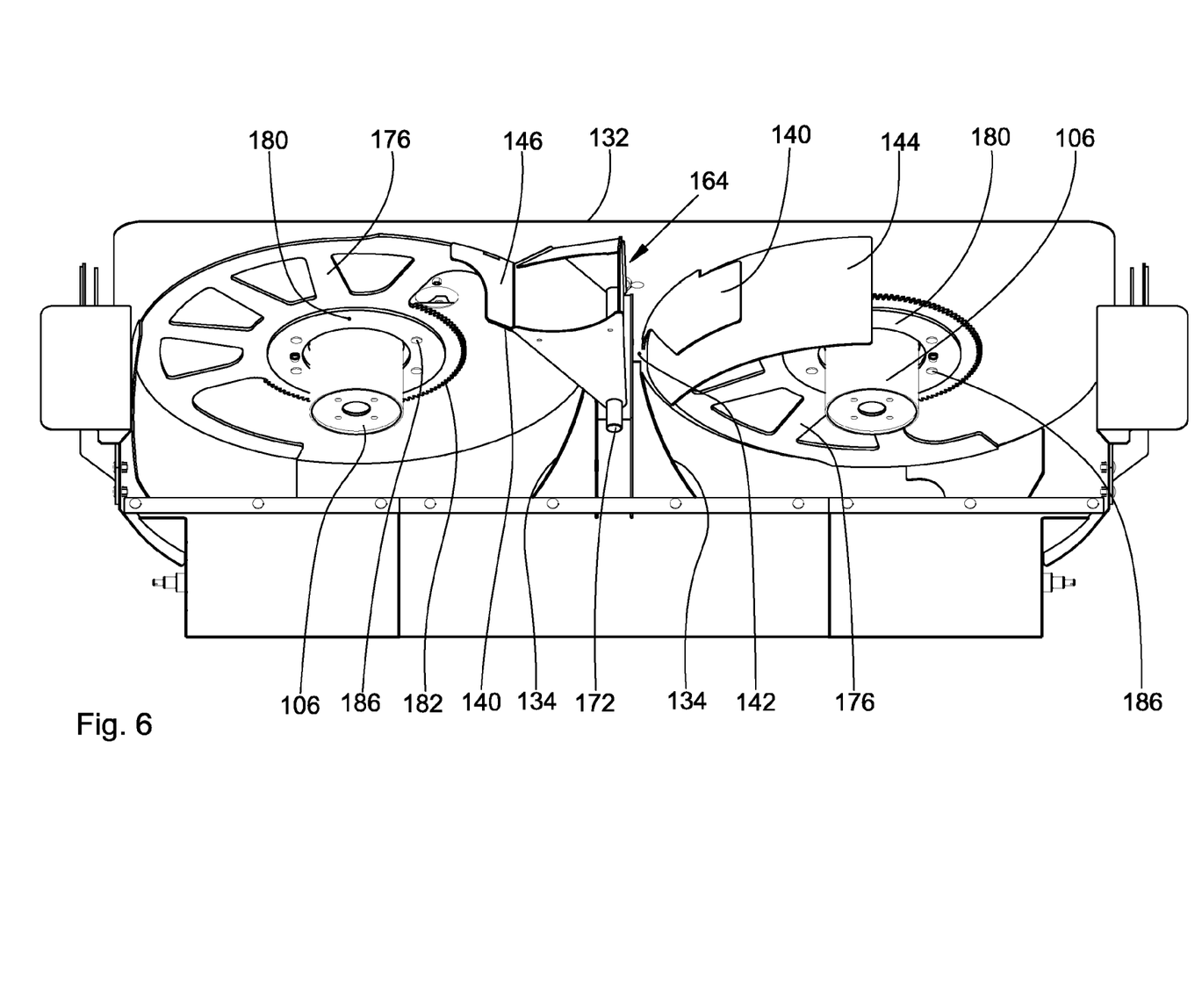
FIG. 6 shows the view from FIG. 5 wherein the shorter shield in the left-hand distribution blower has been brought into a further retracted position.
Figure 7:
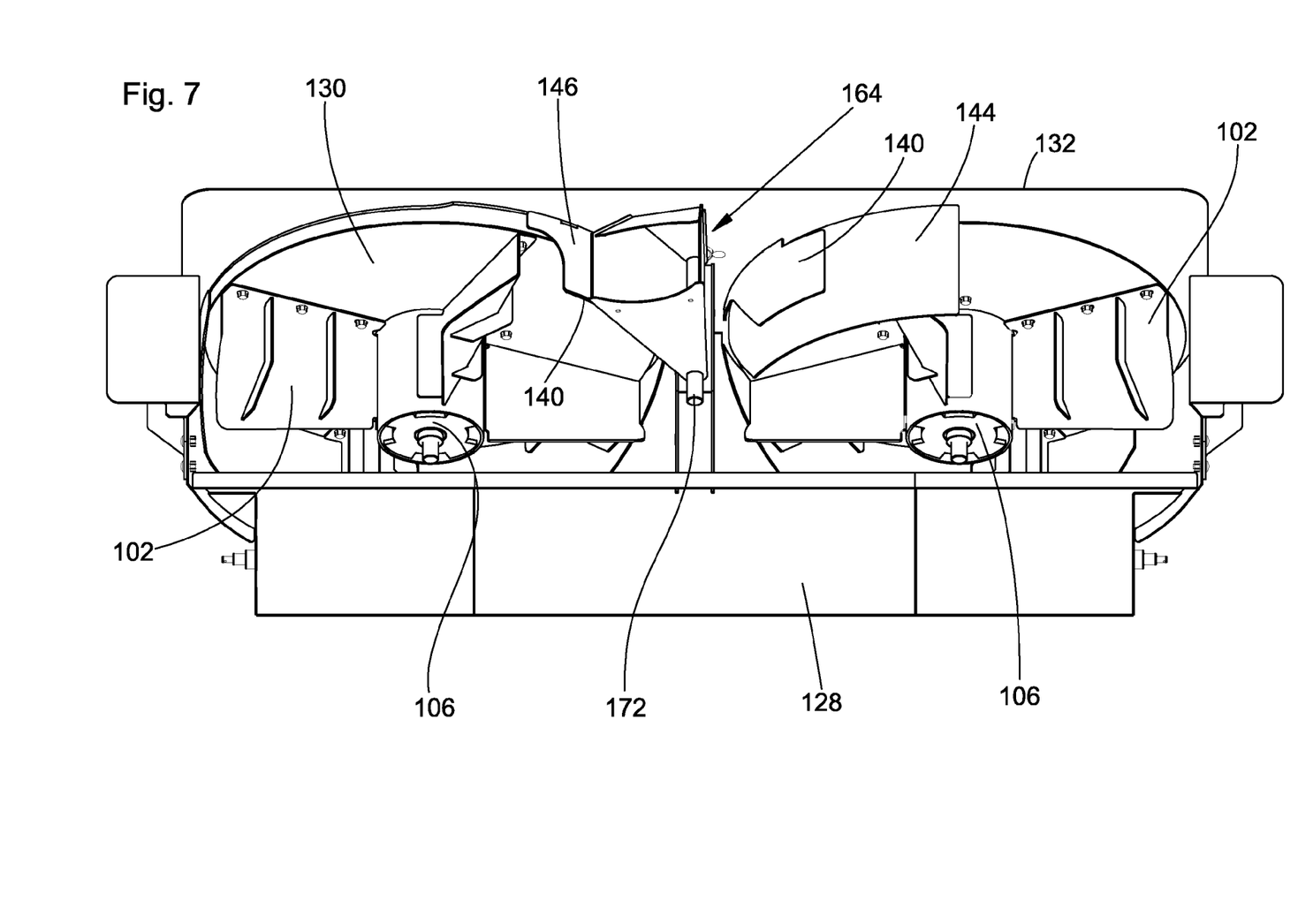
FIG. 7 shows the view from FIG. 6 with mounted rotary plates and paddles.

As is recognizable in FIGS. 5-7, partial casings 140 are furnished with a higher rear section and a lower front section, between which an inclined area is provided.

At their rearward ends, partial casings 140 can be provided selectively with shorter or longer angled areas by positioning first and second shields 144, 146 with different dimensions in the circumferential direction at the rear ends of partial casings 140 by means of an adjusting drive 148 controlled manually by the operator from the cab 16, or independently as a function of the position of the flap, in order to deflect the crop residues outward to a greater or lesser extent by covering distribution blowers 100 and preventing the free ejection of crop residues radially outward, so that the crop residues can only leave distribution blowers 100 after they have passed shields 144 or 146. In swath-laying mode, the chaff can be deposited alongside the swath by moving the first, longer shield 144 to the rear inner end of partial casing 140, or in straw chopping mode, the crop residues are uniformly spread across the field by moving the second, shorter shield 146 to the rear inner end of partial casing 140. In addition, shields 144, 146 of the two distribution blowers 100 can be adjusted independently of one another in order to compensate for side wind and/or slope effects.

The respective shields 144, 146 are fixed jointly and diametrically opposite one another to roughly semicircular rotary holders 176 that are positioned between cover 132 and plates 130. Rotary holders 176 comprise a central area 178 at the central opening through which the associated axis of rotation 108 of the associated distribution blower 100 runs. The central area 178 is axially seated, more particularly, slidingly seated, between cover 132 and a mounting disk 180 connected to cover 132. The central opening of central area 178 radially contacts mounting elements 186 in the form of threaded fasteners connected to cover 132 and/or mounting disk 180, and is therefore fixed in the radial direction. Central area 178 is furnished with teeth 182 on the outside that extend over a part of its periphery and mesh with a gear 184 coupled to drive 148.

The first, longer shields 144 are roughly rectangular in shape, with an angled front lower edge. They can be positioned radially on the inside of partial casings 140. Thereby one can avoid undesired edges on which the relatively small crop residues can become jammed if the first shields 144 are on the inside of the partial casings in their active position, since that is when the chaff, which is particularly critical in this regard, is conveyed. First shields 144 are substantially longer than partial casings 140 in the radial direction of axes 108 of distribution blowers 100.

The second, longer shields 146 are likewise roughly rectangular in shape with a cutout lower rear corner. They can be positioned radially on the outside of partial casings 140. The dimensions of the second shields 146 in the radial direction of axes 108 of distribution blowers 100 correspond roughly to the dimensions of partial casings 140 in the radial direction of the axes 108 of distribution blowers 100.

In the distribution blower 100 drawn on the left in FIG. 5, second shield 146 is in the active position, in which it joins partial casings 140 at the rear. In the distribution blower 100 drawn on the right, second shield 144 is in the active position, in which it joins partial casings 140 at the rear. In FIG. 6, in which guide element 164 is also drawn in, the position of shield 144 of the right-hand distribution blower 100 is not changed with respect to FIG. 5, whereas the position of shield 146 of the left-hand distribution blower 100 has been displaced clockwise relative to FIG. 5, which has the effect that the crop residues are emitted onto the field to a larger extent in the vicinity of the central longitudinal plane of combine 10. In this way, influences from side winds and slopes can be compensated by the operator or automatically, in order to distribute the crop residues as uniformly as possible on the field. In FIG. 7, the positioning of shields 144, 146 is not changed with respect to FIG. 6, but plate 130 and paddles 102 are drawn in. Unlike what is shown in FIGS. 5-7, first shields 144 could also be brought into a position in which they directly adjoin partial casings 134 in order to close the gaps 142 and have the effect that the crop residues are only emitted to the outside.

The invention claimed is:

1. A crop residue chopping-and-distributing arrangement for a combine, comprising a straw chopper (60) equipped with chopping blades (96), and two distribution blowers (100) arranged laterally alongside one another downstream of straw chopper (60), which rotate in opposite directions about axes of rotation (108) in operation, with their areas facing straw chopper (60) moving toward one another, and on the periphery of each of which is provided a first shield (144) and a second shield (146) having a circumferential dimension which is less than a circumferential dimension of the first shield (144), a rotary holder (176) being rotatable about the axis of rotation (108) of each blower (100) and having a respective first shield (144) and a respective second shield 146 fixed thereto, whereby the rotary holders (176) are respectively adjustable about the axes of rotation (108) for modifying the distribution characteristics of the distribution blowers (100) by respectively bringing one or the other of the first and second shields into an active position.

2. The crop residue chopping-and-distributing arrangement according to claim 1, characterized in that in the active position, shields (144, 146) are, as considered looking in the direction of the rotational axes (108), in a tapered area between distribution blowers (100) and behind the rotational axes (108) of the latter.

3. The crop residue chopping-and-distributing arrangement according to claim 1, characterized in that each of said distribution blowers (100) includes a first partial casing extending circumferentially about a front peripheral portion of the blower (100) and a second partial casing extending circumferentially about an inner peripheral portion of the blower, and in that, in the active position, shields (144, 146) adjoin one or the other of the partial casings (134, 140).

4. The crop residue chopping-and-distributing arrangement according to claim 1, characterized in that each rotary holder (176) is rotated by an associated drive (148) about axis of rotation (108).

5. The crop residue chopping-and-distributing arrangement according to claim 4, characterized in that drives (148) are coupled in terms of control to a flap (80) serving to switch between a swath-laying mode and a chopping mode, so that first shield (144) can be brought automatically into the active condition in swath-laying mode in order to deposit the chaff laterally separated from the straw swath.

6. The crop residue chopping-and-distributing arrangement according to claim 1, characterized in that drives (148) are respectively coupled to the rotary holders (176) and can be respectively selectively operated to displace the second shields (146) in the active position independently of one another in order to compensate for side wind or side slope influences.

7. The crop residue chopping-and-distributing arrangement according to claim 1, characterized in that shields (144, 146) are at least approximately diametrically opposite one another on rotary holder (176).

8. The crop residue chopping-and-distributing arrangement according to claim 1, characterized in that rotary holders (176) have a center area (178) with an opening concentric to axis of rotation (108).

9. The crop residue chopping-and-distributing arrangement according to claim 8, characterized in that a hydraulic motor (106) is arranged in the center of the paddles (102) of distribution blower (100) for driving distribution blower (100).

10. The crop residue chopping-and-distributing arrangement according to claim 8, characterized in that central area (178) is axially seated between a cover (132) of the distribution blower and a mounting disk (180) connected to cover (132), and the center opening radially contacts mounting elements (186) connected to at least one of the cover (132) and mounting disk (180), and is therefore fixed in the radial direction.

11. The crop residue chopping-and-distributing arrangement according to claim 8, characterized in that central area (178) is furnished with teeth (182) on the outside that extend over a part of its periphery and mesh with a gear (184) coupled to the drive.

12. The crop residue chopping-and-distributing arrangement according to claim 1, characterized in that first shields (144) have a height which is greater than a height of the second shields (146).

13. The crop residue chopping-and-distributing arrangement according to claim 1, characterized in that, relative to the axes of rotation (84) of the rotary holders (176), in their active position, first shields (144) can be positioned on the inside of a respective adjacent partial casing (140).

14. The crop residue chopping-and-distributing arrangement according to claim 1, characterized in that, relative to the axes of rotation (84) of the rotary holders (176), in their active position, second shields (146) can be positioned on the outside of a respective adjacent partial casing (140).

15. A combine (10) having a crop residue chopping-and-distributing arrangement according to claim 1.

* * * * *